Oct. 13, 1925.
J. H. MENDENHALL
1,556,864
SECURING AND LATCHING MECHANISM FOR AUTOMOBILE HOOD LIDS
Filed June 13, 1924
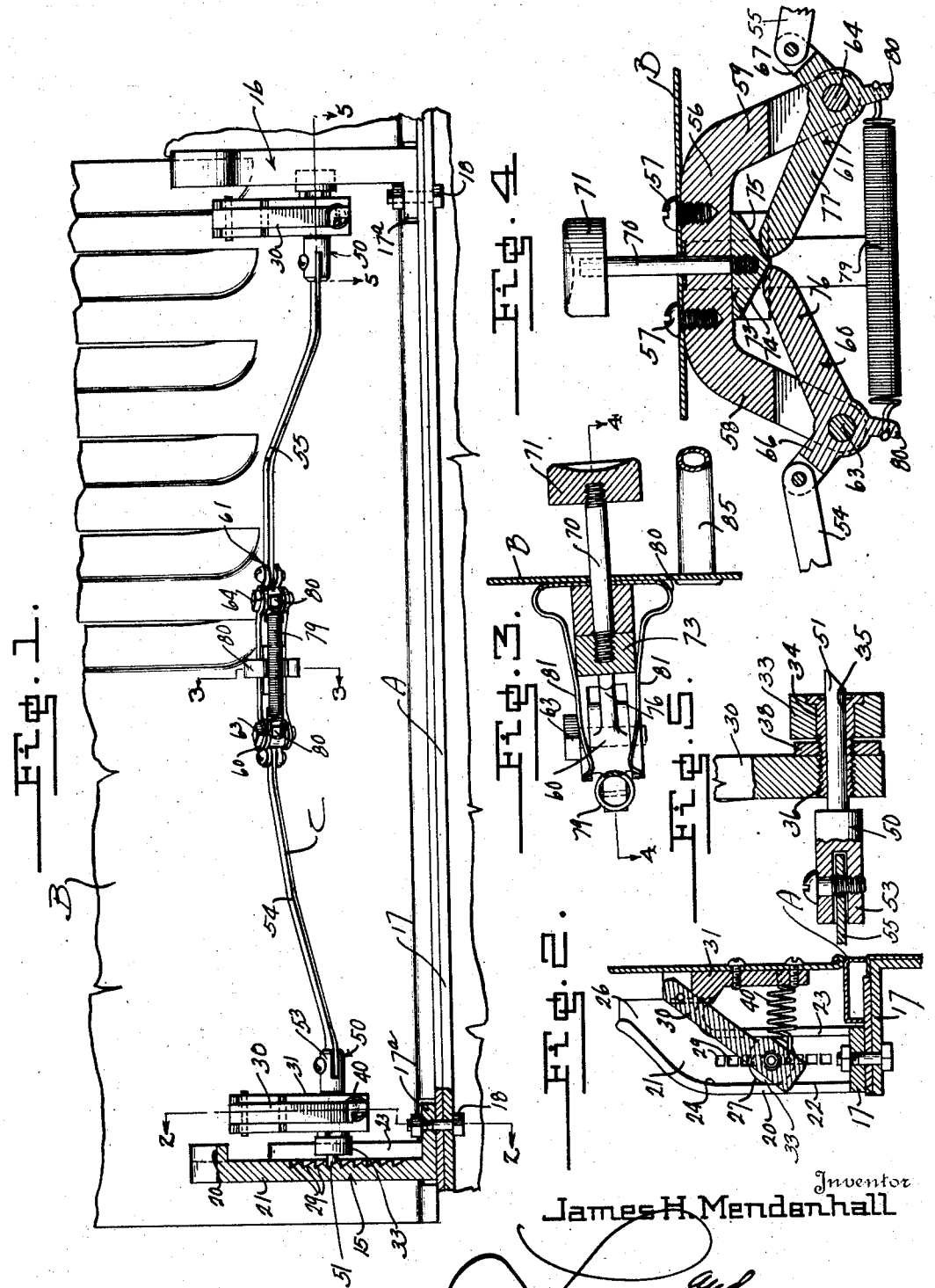
Inventor
James H. Mendenhall
By Lancaster and Allwine
Attorneys Patented Oct. 13, 1925.

1,556,864

UNITED STATES PATENT OFFICE.

JAMES H. MENDENHALL, OF NOTTINGHAM, PENNSYLVANIA.

SECURING AND LATCHING MECHANISM FOR AUTOMOBILE HOOD LIDS.

Application filed June 13, 1924. Serial No. 719,854.

*To all whom it may concern:*

Be it known that I, JAMES H. MENDENHALL, a citizen of the United States, residing at Nottingham, in the county of Chester and State of Pennsylvania, have invented certain new and useful Improvements in a Securing and Latching Mechanism for Automobile Hood Lids, of which the following is a specification.

This invention relates to improvements in means for fastening and securing the closure parts of hoods to automobile frames.

The primary object of this invention is the provision of latching and securing means for maintaining the closure parts of hoods in a stable and non-vibratory relation with respect to the chassis of the automobile upon which the hood is provided.

A further object of this invention is the provision of novel means for resiliently urging the automobile closure against the frame.

A further object of this invention is the provision of novel releasing means for a hood latching construction of the character hereinafter described.

Other objects and advantages of this invention will be apparent during the course of the following detailed description.

In the accompanying drawing, wherein for the purpose of illustration is shown only a preferred embodiment of this invention:—

Figure 1 is a fragmentary view of the inside portion of a hood closure part showing the relation of the improved hood securing and latching details with respect to the automobile frame and the hood closure part.

Figures 2 and 3 are cross sectional views taken on their respective lines in Figure 1 of the drawings.

Figure 4 is a cross sectional view taken substantially on the line 4—4 of Figure 3, showing the operating mechanism of the hood latching structure, and Figure 5 is a cross sectional view taken substantially on the line 5—5 of Figure 1.

In the drawing, wherein similar reference characters designate corresponding parts throughout the several views, the letter A may designate the frame of an automotive vehicle of which the hood closure B is a part; the latter being secured and latched to the frame A by the means C.

The securing and latching means C includes racks 15 and 16 which are supported within the hood structure upon the horizontal flange 17 of the automobile frame A. The rack or keeper structures 15 and 16 are analogous in structure, each of the same including a foot or base portion $17^a$ which is bolted as at 18 to the flange 17. They furthermore include an upstanding substantially channel shaped keeper portion 20, which includes the rack wall 21 with the channel flanges 22 and 23 extending outwardly therefrom to provide a way or groove 24 adapted to receive details of the releasing construction to be subsequently described. At their upper ends the flanges 22 and 23 are arcuated laterally, providing an entrance way 26 through which the keeper rollers 27 may rotatably enter the groove 24 as will be subsequently described. The rack wall 21 is vertically provided with a series of indentations 29, in which a bolt structure engages as will be subsequently described. The frame keeper members 15 and 16 are secured to the frame 17 at opposite ends of the hood closure B, with the groove 24 thereof in facing relation.

Adjacent each of the keeper members 15 and 16 an arm 30 is pivotally supported by a bracket 31 secured upon the inside surface of the hood B; this arm 30 at its free end rotatably supporting a roller 33 laterally thereof, as upon a hollow bolt 34 which provides a passageway 35 therein. The hollow bolt 34 includes the screw threaded shank portion 36 which is screw threaded in a suitable opening provided in the lower end of the arm 30, and a washer 38 is preferably interposed between the roller 33 and the arm 30 to permit the anti-friction movement of the roller.

In so far as the operation of the rollers 33 in the way 24 of the keeper structures 15 and 16 are concerned, it is believed that it is obvious that upon the closing movement of the hood B, the rollers 33 will enter the entrance way 26 of the way 24 and be moved downwardly in said ways between the channel flanges 22 and 23, drawing the arms 30 outwardly from the brackets 31. As the free ends of these arms 30 are held by tension springs 40, which tension springs are also connected with the brackets 31, it can be readily understood that as the arms at their ends move outwardly from the closure B incident to riding in the way 24, that the springs 40 will be tensioned and will thus have a tendency to draw the hood B tightly against the frame A to prevent any outward vibratory movement thereof.

There is also a latching feature provided in connection with the structure C, which is cooperably disposed with respect to the securing means provided by the details above described. This latching feature includes bolts 50, with reduced shanks 51 which slidably extend through the passageways 35 of the roller supporting bolts 34. The latching bolts 50 include bifurcated barrel portions 53, pivotally receiving therebetween ends of connecting links 54 and 55.

At the lower portion of the hood B, interiorly of the same, and substantially centrally of the forward and rear edges thereof, a substantially U-shaped bracket 56 is supported, as by bolts 57, which includes the forwardly extending bifurcated legs 58 and 59, having bell crank levers 60 and 61 pivoted therein as upon pins 63 and 64 respectively. The bell crank levers 60 and 61 include outwardly extending relatively short legs 66 and 67 respectively, which are bifurcated and pivotally connect the opposite ends of the connecting links 54 and 55 thereto so that upon rocking of the bell crank levers 60 and 61 the bolts 50 may be withdrawn or inserted into the passageways 35 of the roller bolts 34 for cooperation with the teeth 29 upon the rack portions of the keepers 15 and 16.

It is preferred to provide a single operating member for the latching portions of the invention, and this includes a pin 70 slidably supported by the bracket 59 and including a headed finger engaging portion 71 exteriorly of the hood B, and an interior detachable cam member 73 which includes the tapered surfaces 74 and 75 having the free ends of the longer legs 76 and 77 respectively of the bell crank levers 60 and 61 riding thereagainst. A single expansion spring 79 is provided, engaging projections 80 formed on the bell crank levers 60 and 61 adjacent the pivotal mounting of said bell crank levers, so that contraction of said spring will normally urge the free ends of the longer legs 76 and 77 against the cam plate 73. A substantially U-shaped spring 80 which is secured by the bracket 56 in a set relation, has the resilient fingers 81 thereof normally operating against opposite sides of the cam plate 73 to maintain the same in a definite relation so that the free ends of the bell crank legs 76 and 77 may ride against the cam tapered surfaces 74 and 75.

It is to be noted that the free ends of the bolt shanks 51 are tapered, for cooperation in the V-shaped tooth depressions 29 in the rack walls 21, so that upon closing of the hood part B each bolt shank 51 will ride downwardly over these depressions 29, and any attempt to raise the hood part B will be prevented incident to insertion of the bolt shank 51 in any of these depressions 29.

The operation of the latching feature of this invention will be apparent from the foregoing discussion. As the closure part B of the hood structure is moved to a closed relation the bolt shanks 51 will engage the rack walls 21 and ride downwardly over the keeper recesses 29, entering the same and preventing any upward attempted movement of the closure portions B. It can be readily understood that the hood closure parts B may thus be firmly closed in a downward relation and prevented from any upward vibratory movement by means of the bolt shanks 51 engaging at the ends of the hood in the rack walls 21.

When it is desired to open the hood closure part B it is merely necessary for the operator to press inwardly upon the button head 71 and the pin 70 will be moved inwardly so that the cam plate 73 engaging the bell crank levers 60 and 61 will move the latter to extend the tension spring 79, and notwithstanding the force imposed by the latter the links 54 and 55 will be drawn toward the operating mechanism for retracting the bolt shanks 51 from the rack recesses 29, and the hood may be readily lifted. It is to be noted that the operating head 71 is placed conveniently right above the lifting handle 85 of the hook B, as is illustrated in Figure 3 of the drawings.

From the foregoing description of this invention it is apparent that a novel type of latching or securing structure for the hoods of automotive vehicles has been provided which will maintain the hood lids firmly closed in a non-vibratory position so that they cannot become accidentally disconnected.

Various changes in the shape, size, and arrangement of parts may be made to the form of invention herein shown and described, without departing from the spirit of this invention or the scope of the claims.

I claim:

1. The combination with an automobile frame and a closure part of a hood, an elongated cam shaped track fixedly supported by the frame, and a resiliently supported member carried by the hood adapted to engage the track as the closure part of the hood is moving to closed position and ride therealong to urge the closure part snugly against said frame.

2. In a latching device for automobile hoods the combination with an automobile frame and a closure as a part of the hood, an elongated track carried by the frame, an arm movably carried by the closure, means on said arm adapted to enter the track and ride therealong as the closure is moving to shut position, and a spring normally urging the arm so that the means will engage firmly against said track and resiliently urge the hood closure against said frame in a non-vibratory position.

3. In a latching device for automobile hoods the combination with an automobile frame and a closure part of the hood, an elongated channel shaped trackway, an arm movably supported by the hood, a spring for normally forcing the arm toward the hood, and means carried at an end of said arm adapted to enter the trackway as the hood closure is moved to a set position, said trackway being of such formation as to move the arm away from the hood as the closure is moving to a set position whereby to tension said spring for resiliently urging the hood closure against said frame.

4. In a securing structure for the hoods of automobiles the combination with a frame and a closure part of a hood, a pair of tracks supported by said frame at the ends of said hood, arms movably supported at the ends of said hood, springs urging the arms toward said closure, and means supported by said arms at their free ends adapted to engage the tracks whereby to draw the closure against said frame as the hood closure is moved to a set position and to actuate said springs in so doing.

5. The combination with an automobile support and a closure part of a hood, a resiliently supported member carried by the hood, and a cam shaped track connected with the support for receiving the resiliently supported member of the hood thereagainst, said track having a portion against which the supporting member rides sloping away from the hood whereby to draw the hood against the support as the hood is moved to closed position.

6. The combination with an automobile frame and a closure part of a hood, a cam shaped track fixed with the frame, a tooth carried by the track, an arm movably connected with the closure part of the hood, means resiliently urging said movable arm toward the hood, said arm being associated with the track for riding therein as the closure part of the hood is moved to a closed position for urging the closure part of the hood snugly against said frame, a bolt movably carried by said arm for locking cooperation with the tooth of said track, and means for controlling the operating relation of said bolt with respect to its tooth.

7. In combination with an automobile frame and hood construction including a movable closure, a track secured to the frame, a keeper embodied in said track, resiliently supported means on the movable closure of the hood for engaging the track to urge the hood against the frame as the hood is closed, and a locking bolt movably carried by said resiliently supported means for cooperation with the keeper of said track.

8. In combination with an automobile frame and hood construction including a movable closure, a keeper carried by the frame, a locking bolt movably carried by the closure, an operating member on said closure, a link connected with said bolt, a bell crank lever pivotally carried intermediate its ends upon said hood and connected at one end with said link, and spring means engaging said bell crank adjacent its pivot mounting to normally urge the bolt into engagement with its keeper.

9. In combination with an automobile closure part and a frame, a pair of keepers carried by the frame, a bracket carried within the hood, a pair of bell crank levers carried by said bracket, bolts for each of said keepers, means connecting said bolts with said bell crank levers, a spring engaging both of said bell crank levers adjacent their pivotal mounting upon said bracket whereby to normally urge the bolts into engagement with their respective keepers, and operating means for moving said bell crank levers to withdraw said bolts from said keepers whereby the hood closure may be raised.

10. In a hood latching structure of the class described the combination with the movable lid part of a hood, a U-shaped bracket carried within said hood including leg portions extending inwardly of the hood, bell crank levers pivotally carried on the leg portions of said bracket, a spring under tension connected at its ends to said bell crank levers adjacent their pivotal mounting on said hood bracket, a cam shaped operating member with which the spring normally maintains the bell crank levers in engagement, and a thumb piece for said operating member by which the latter may be moved to move said bell crank levers against the tension of the spring.

11. In a hood securing and latching structure of the class described the combination with a frame and a movable closure lid, a track member including a tooth carried by said frame, an arm resiliently supported by said hood lid within the same, and having a passageway therein, means carried by the arm adapted to engage the track member whereby to force the lid against said frame when the lid is moved to a closed position, a bolt reciprocably carried in the passageway of said arm adapted for cooperation against said tooth, and operating means for reciprocating said bolt to move it into or out of locking engagement with said tooth.

JAMES H. MENDENHALL.